Patented May 4, 1954

2,677,685

UNITED STATES PATENT OFFICE 2,677,685

5-HETEROCYCLIC AMINO DERIVATIVES OF BENZOPHENOXAZINE

Moses L. Crossley, Plainfield, Corris M. Hofmann, Bound Brook, and Paul F. Dreisbach, Somerville, N. J., assignors to American Cyanamid Company, New York, N. Y., a corporation of Maine No Drawing. Original application February 23, 1952, Serial No. 273,154. Divided and this application February 3, 1953, Serial No. 334,976

8 Claims. (Cl. 260—244)

1

This invention relates to a new series of dyes which are 5-heterocyclic amino substituted benzophenoxazines, and is a division of our copending application Serial No. 273,154 filed February 23, 1952.

The present invention is directed to a new group of dyestuffs, which in the form of their salts, range from blue to green, the free bases giving reddish colors in alcohol solution. The type formula of the new series in the form of its salts is as follows:

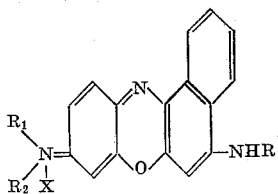

in which R is an aromatic heterocyclic radical, $R_1$ and $R_2$ are hydrogen or aliphatic radicals, and X is an anion. The structure is capable of resonating and the formula given corresponds to one of the two structures.

The dyestuffs may also exist in the form of the base for which the following formula is the most probable:

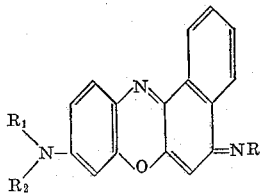

in which R is an aromatic heterocyclic radical and $R_1$ and $R_2$ are hydrogen or aliphatic radicals. Most of the members of the new series, however, are obtained more easily in the form of their salts in acid solution. These salts are addition salts with strong mineral acids, such as nitric, hydrochloric, hydrobromic, and the like. In most uses, the particular anion is immaterial, as the characteristics of the compound are determined primarily by the cation. Therefore, in practical use, the nitrates or hydrochlorides are usually prepared, as these salts are the simplest and cheapest to make. It should be understood, however, that the invention is not limited to the hydrochlorides and nitrates, and the other salts are included.

In the specification and claims, the hetero- cyclic radical R may be defined as an unsaturated heterocyclic ring in which the bond from the 5-position of the benzophenoxazine ring is attached through the amino nitrogen to a nuclear carbon atom of the heterocyclic radical. The heterocyclic radical may contain sulfur in addition to nitrogen, for example, thiazole, benzothiazole, isothiazole, thiazine, thiadiazine, etc.

The aliphatic amino group in the 9-position may be either a monoaliphatic or dialiphatic amino group. Among the most important dyestuffs are those in which the aliphatic group is a lower alkyl group, such as methyl, ethyl, propyl, isopropyl, butyl, sec. butyl, etc. Other alkyl groups, such as amyl, octyl, dodecyl or octadecyl, may be attached to the 9-amino nitrogen as well as alkylene groups, such as allyl, methallyl, oleyl, etc. In this specification and in the claims, the term aliphatic amino group will define a radical having the structure:

wherein $R_1$ is an aliphatic hydrocarbon chain and $R_2$ is either an aliphatic hydrocarbon chain or hydrogen.

The products of the present invention are useful as dyestuffs and biological stains and some of the members are active against certain bacteria, such as mycobacteria.

The products of the present invention may be produced by various processes, and it is not intended to limit them to any particular process of preparation. However, we have found that a very desirable process involves the reaction of an amino heterocyclic compound with a 9-dialkylaminobenzo[α]phenoxazonium salt, such as a chloride, nitrate, etc. In a more specific aspect of the present invention, this process is included.

For many staining uses, an alcoholic solution of the dyestuff is used, and in such cases it is frequently not necessary to isolate the purified product as a solid. When the dyestuffs are to be used in the form of solutions, a considerable saving in cost results with certain members which are difficult to obtain in the form of a pure solid without considerable losses of material. Substantial cost savings may thus be realized in many cases.

The invention will be described in greater detail in conjunction with the following specific examples. The parts are by weight.

EXAMPLE 1

*5(2'-thiazolylamino-9-diethylaminobenzo[a]phenoxazonium chloride*

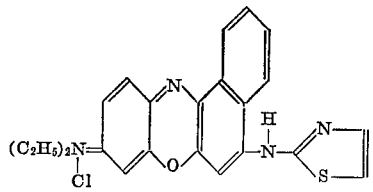

183 parts of 9-diethylaminobenzo[a]phenoxazonium nitrate is dissolved in 1250 parts of ethanol by gentle warming, cooled to slightly above room temperature, and 150 parts of 2-aminothiazole added. The solution gradually changes from a red-blue color to a deep green-blue color. It is stirred occasionally until reaction appears complete and is then allowed to stand overnight. A dark green solid precipitates which is recovered by filtration, slurried in 150 parts of warm ethanol and treated with 10 parts of ammonium hydroxide. The mixture changes to a deep red color and the solid is recovered by filtration. The precipitate is then slurried in 50 parts of warm ethanol and one part of 12 N hydrochloric acid added. The chloride separates out as a dark green solid, is recovered by filtration, and dried at 55° C.

If it is desired to purify the chloride obtained, it may be dissolved in 100 parts of hot aqueous alcoholic hydrochloric acid having the composition of one part water, one part alcohol and two parts of 12 N hydrochloric acid.

The maximum absorption of a faintly ammoniacal ethanol solution of the dyestuff is at 572 m$\mu$.

EXAMPLE 2

*9-diethylamino-11-methylbenzo[a]phenoxazonium nitrate*

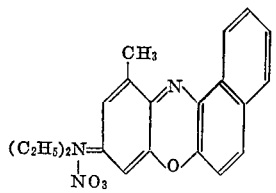

A solution of 720 parts of beta naphthol, 5000 parts of ethyl alcohol and 400 parts of zinc chloride is boiled in a suitable vessel, while 1140 parts of p-nitroso diethyl m-toluidine is added in small portions over a period of 5 hours. The reaction solution changes from yellow to brown to purple during the addition of the nitroso. After the nitroso compound has been added, the purple mixture is stirred one-half hour, filtered hot and the dark crystalline product is washed on the funnel with warm alcohol. There is obtained 718 parts of the zinc chloride double salt which is converted to the nitrate salt by dissolving 600 parts of the zinc chloride salt in 40,000 parts of hot water, clarifying, cooling the filtrate and adding 2130 parts of nitric acid (sp. gr. 1.42). The nitrate separates as a nearly black solid.

There is obtained, after filtering and drying, 547 parts of the nitrate salt.

EXAMPLE 3

*5(2'-thiazolylamino)-9-diethylamino-11-methylbenzo[a]phenoxazonium nitrate*

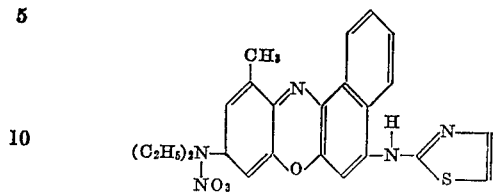

114 parts of 9-ethylamino-11-methylbenzo[a]phenoxazonium nitrate is dissolved in 1250 parts of warm ethyl alcohol, then 90 parts of 2-aminothiazole is added and the solution is warmed on a steam bath for a few minutes. The color changes from a reddish-blue to a greenish-blue. After standing a few hours, a thick mass forms, which is allowed to stand at room temperature for several hours to complete the reaction. By filtration the product is obtained as a green solid (46 parts) which can be purified by crystallization from 500 parts of hot ethyl alcohol to give 34 parts of the product as a brown solid. This solid dissolves in alcohol giving a purple solution which changes to yellow by adding ammonia and back to purple by adding hydrochloric acid.

EXAMPLE 4

*5-(2-benzothiazolylamino)-9-di-propylaminobenzo[a]phenoxazonium nitrate*

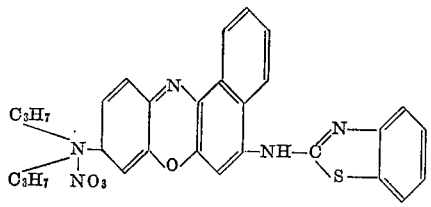

To 4.7 parts of 9-di-n-propylaminobenzo[a]phenoxazonium nitrate, are added 25 parts of ethyl alcohol and 5.4 parts of 2-aminobenzothiazole. The mixture is warmed gently for a few minutes to effect solution. After stirring, the solution is allowed to stand for about two days at room temperature in an open vessel during which time a solid separates. The material which precipitates is removed by filtration and purified by treatment with ethyl alcohol.

The purified dark-colored solid forms a blue solution in ethyl alcohol which changes to a green-blue color upon the addition of an alkaline reagent. An acidified alcohol solution of this product shows a maximum absorption of 690 m$\mu$, measured spectrophotometrically. A slightly alkaline alcohol solution shows a maximum absorption at 593 m$\mu$.

We claim:

1. Compounds selected from the class consisting of bases having the formula:

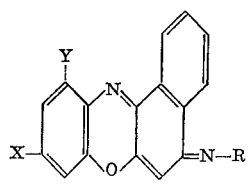

in which X is an N aliphatic hydrocarbon amino group of not more than 18 carbon atoms, Y is a substituent selected from the group consisting of hydrogen and lower alkyl radicals, and R is a heterocyclic radical containing one nitrogen atom and one sulfur atom in the heterocyclic ring; and addition salts of the bases with acids.

2. A base having the formula:

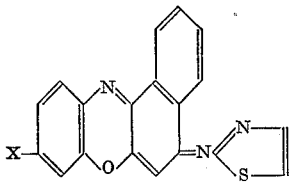

in which X is an N aliphatic hydrocarbon amino group of not more than 18 carbon atoms.

3. The acid addition salt of a base having the formula:

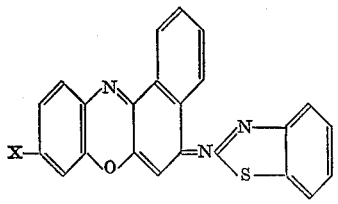

in which X is an N aliphatic hydrocarbon amino group of not more than 18 carbon atoms.

4. A compound having the formula:

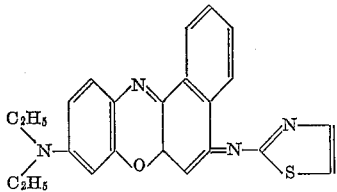

5. A compound having the formula:

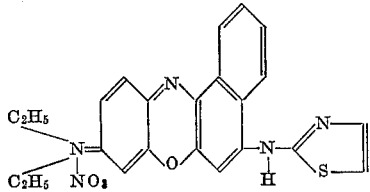

6. A compound having the formula:

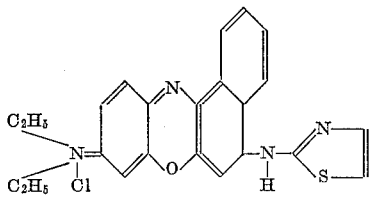

7. A compound having the formula:

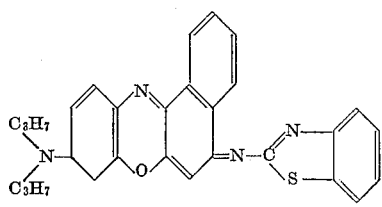

8. A compound having the formula:

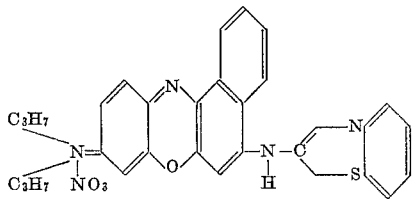

References Cited in the file of this patent

UNITED STATES PATENTS

| Number | Name | Date |
|---|---|---|
| 2,528,862 | Crossley et al. | Nov. 7, 1950 |
| 2,528,863 | Crossley et al. | Nov. 7, 1950 |
| 2,647,895 | Crossley et al. | Aug. 4, 1953 |